(12) United States Patent
Stuart

(10) Patent No.: US 7,032,942 B2
(45) Date of Patent: Apr. 25, 2006

(54) EXTENSIBLE GRIP STAND-UP SHOVEL

(76) Inventor: Thomas I. Stuart, 267 St. Andrew's St., Cambridge, Ontario (CA) N1S 1N9

( * ) Notice: Subject to any disclaimer, the term of this patent is extended or adjusted under 35 U.S.C. 154(b) by 3 days.

(21) Appl. No.: 10/831,040

(22) Filed: Apr. 26, 2004

(65) Prior Publication Data
US 2004/0232715 A1 Nov. 25, 2004

(30) Foreign Application Priority Data
May 20, 2003 (CA) .................................... 2429003

(51) Int. Cl.
*B25G 1/04* (2006.01)

(52) U.S. Cl. .................. 294/58; 294/54.5; 16/426; 16/429

(58) Field of Classification Search ............... 294/49, 294/54.5, 57, 58, 59; 16/426, 427, 428, 429; 15/236.04

See application file for complete search history.

(56) References Cited

U.S. PATENT DOCUMENTS

| 725,905 A | 4/1903 | Williams |
| 845,592 A | 2/1907 | Stewart |
| 911,291 A | 2/1909 | Byor |
| 2,521,441 A | 9/1950 | Bickley |
| 4,200,324 A | 4/1980 | Helton |
| 4,531,713 A | 7/1985 | Balboni |
| 4,615,553 A * | 10/1986 | Hultine ........................ 294/58 |
| 5,472,252 A * | 12/1995 | Barone ........................ 294/58 |
| 5,704,672 A | 1/1998 | Sims |

FOREIGN PATENT DOCUMENTS

| CA | 2188956 | 4/1998 |
| FR | 2546 363 | * 11/1984 |
| GB | 2 156 641 | * 10/1985 |

* cited by examiner

*Primary Examiner*—Dean J. Kramer

(57) ABSTRACT

This invention describes an ergonomic shovel having an extensible grip connectably attached to a tether and return spring obstensibly located inside the primary handle and having a fairlead to facilitate the extending and retracting in accordance with prior art for stand-up shovels. A pocket or frame structure is described for disposition of the retracted auxiliary grip to facilitate storage.

7 Claims, 3 Drawing Sheets

Fig. 1
Fig. 2
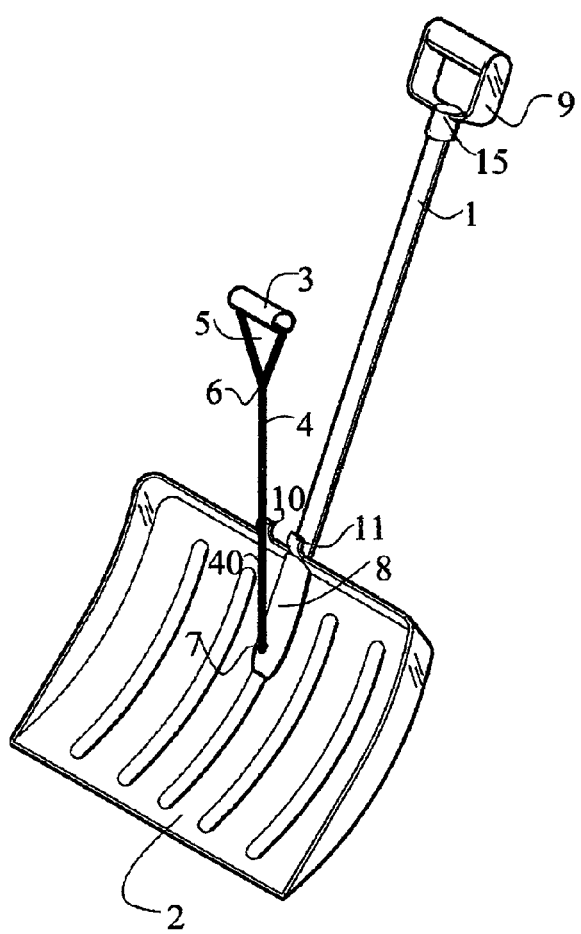
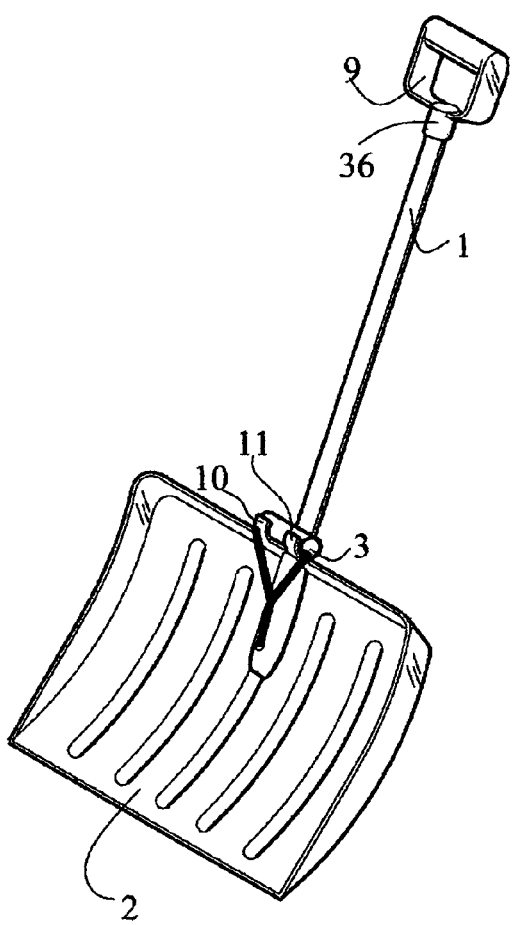
Fig. 3
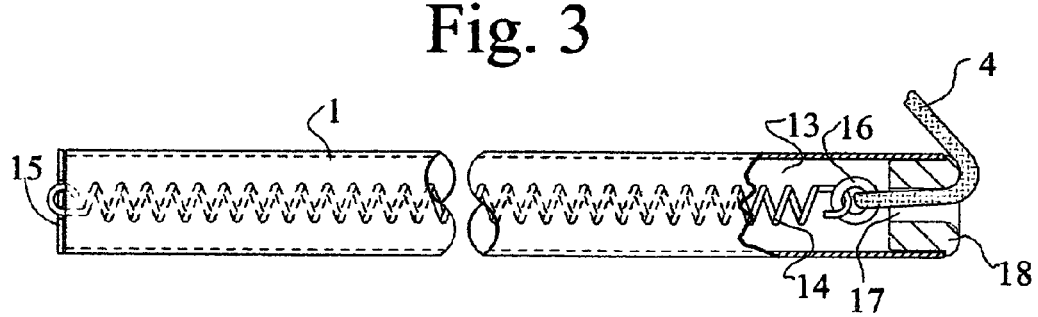

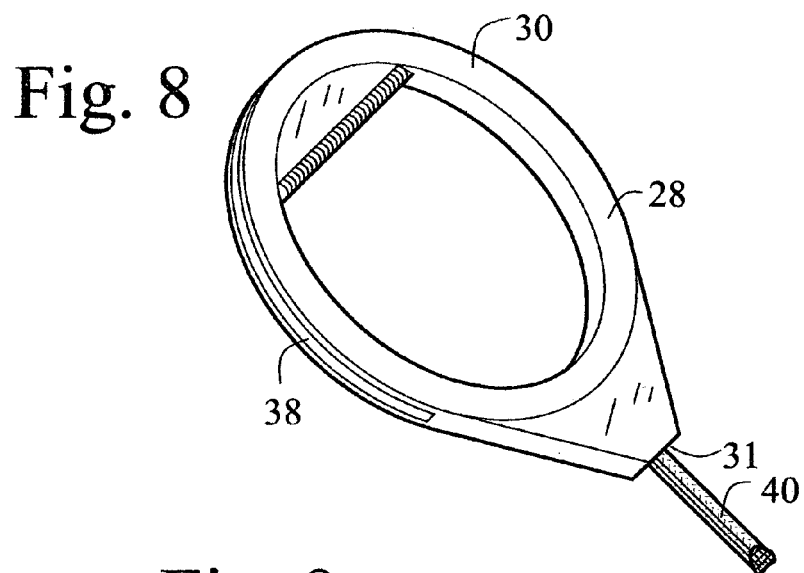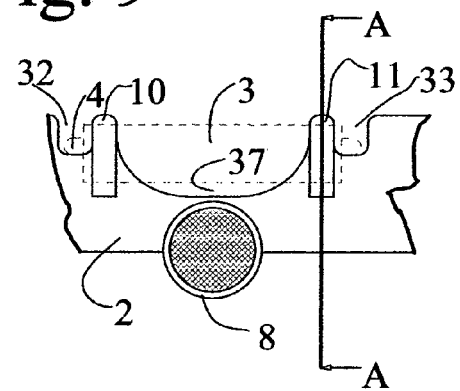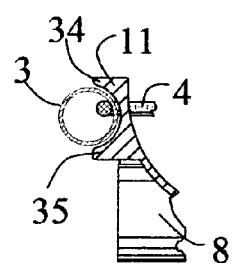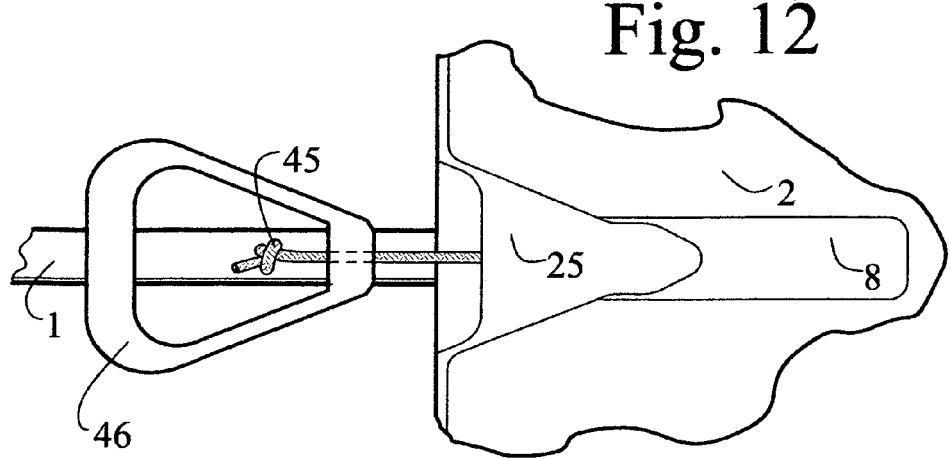

EXTENSIBLE GRIP STAND-UP SHOVEL

TECHNICAL FIELD

This invention relates in the majority to snow shovels or similar burden carrying devices having an auxiliary handle tethered in such a way as to be retractable to a conveniently stored disposition.

BACKGROUND OF INVENTION

It is well known to those skilled in the art that ergonomic handle principles attempt to reduce bending of the lower back thereby reducing spinal injury. In the 1907 U.S. Pat. No. 845,592 to Stewart, we are taught that an upward bend in the handle located proximal to the shovel scoop will elevate the forward grip position reducing the curvature of the operators spine. We are also taught in the 1903 U.S. Pat. No. 725,905 to Williams, that lifting and carrying of a load is made easier if the forward grip position is moved directly above the load as described mathematically in mechanical moments of the laws of levers.

In the 1909 U.S. Pat. No. 911,291 to Byor, we are shown that the forward grip position can be elevated to any height using an auxiliary grip with an adjustable resilient shank member with means for securing the same to the primary handle shaft. In the 1950 U.S. Pat. No. 2,521,441 to Bickley, we are taught that a flexible cord with terminating hand piece also elevates the forward hand grip point while improving the free universal action to throw material sideways and the mechanical efficiency of having the load placed directly under the hand grip point for lifting.

The U.S. Pat. No. 4,200,324 to Helton, describes disposition methods of storage for grips tethered by means of flexible material using retaining holes or clips located on the primary handle.

In U.S. Pat. No. 5,704,672 to Sims, the flexible cord is described as a resilient bungee cord which lengthens and shortens a portion of it's length to facilitate a smooth shoveling action but does not attempt to solve the problem of disposition. Like wise in U.S. Pat. No. 4,531,713 to Balboni, an elastic line lengthens and shortens to form a retrieval. Although prior art describes flexible means acting as ergonomic handles, the storage and disposition of said means of auxiliary handle is inconvenient and in the majority, prior art grips with flexible cord means are allowed to drag, impact, sag or traverse universally during the stroke of the tool. For a stand up shovel to be commercially accepted the auxiliary grip must be suitably arranged for convenience and the necessary elements defined so that the handle is advantageous and not obstructively placed to the traditional use of the shovel and as such, prior art has been unable to compose the necessary elements. Further, in a shovels introduction to the burden for loading and unloading, the flexible cord means should not cause the scoop to hover or bounce but should have a fixed length for elevating the load upwards on to a pile without having heavier loads cause the scoop to fall farther away towards the ground and the auxiliary grip should be completely and easily retracted safely out of the way when not in use.

In addition to the advantages of reduced spinal curvature produced by a stand up shovel, a hand grip located for maximum lifting mechanical efficiency and extensible from a comprehensible storage disposition having a low force biasing means obstensibly located inside the primary handle has not been taught in prior art.

Further, to facilitate a wide variety of dispensing locations for an extensible tethered grip, a fairlead best described as ring or block having a passage through which a flexible line may pass at diverging angles is used. To prevent snagging or chafing the fairlead may have rotatable elements for increased friction reduction of the return line. The fairlead may also have a calibrated orifice to prevent intermediary components of the return line pasing through the fairlead.

DISCLOSURE OF INVENTION

It is the primary purpose of the present invention to provide an ergonomic shovel handle in accordance with prior art for stand-up shovels which will include a readily accessible auxiliary hand grip easily withdrawn from a pocket located on the shovel.

It is also a purpose of this invention to provide an opening substantially within the scoop area for the egress of a tether attached to said hand grip or in another form of this invention to provide an anchor point within the area of the scoop as a means of tethering an auxiliary grip.

It is also a purpose of this invention to provide a curved surface and guiding means in the form of a fairlead within the primary handle to facilitate redirecting the extendible return line at diverging angles towards the hand grip. Fairlead may be constructed to act as a blocking means to limit the extension length of the return line.

It is a purpose of this invention to provide an anchor point, for a tension spring or longitudinally elastic element, substantially within the primary handle at a point distal from said egress and blocking means and substantially interposed of a "D" shaped grip located on the primary handle.

In it's simplest form, according to the preferred elements of the present invention, said hand grip may be formed of a hollow cylinder interposed by a flexible string means looped to form an "A" shape as part of a tethering means of a return line which includes a biasing means at the opposite end At a point along the tethering means length is located a blocking means for the purpose of limiting the extension of the hand grip and indirectly lifting the scoop from a point behind the guiding means.

It is also the purpose of the present invention to provide a holder or pocket for storage of the retracted hand grip within the embodiment of the shovel and in some cases strengthen the said pocket to act as a load bearing point for lifting using said tethering means.

It is also an objective of this invention to provide an alternative biasing means and tether means for the auxiliary grip in the form of a reel mechanism to wind up or be pulled out. The said reel mechanism may be formed as part of the shovel scoop, as part of the grip or as part of a unitary shovel embodiment.

It is also a purpose of this invention to provide the best shoveling action so that the scoop rests upon the ground with the hand grip conveniently grasped by the user standing erect. The opposition of return line retraction force to the force of gravity holding the unburdened weight of the scoop upon the ground must be matched so that the scoop will be held in it's distal position by gravity upon the blocking means and not hover or bounce elastically from the tension of the biasing means.

BRIEF DESCRIPTION OF DRAWINGS

The preceding and other objectives of this invention will be more readily apparent from the following description read in conjunction with the accompanying drawings, in which:

FIG. 1 is a perspective view of the invention with grip extended;

FIG. 2 is a perspective view of the invention with grip retracted;

FIG. 3 is a broken out section side view of the primary handle;

FIG. 8 is a perspective view of a grip with reel mechanism;

FIG. 9 is a partial view of a deposition framework for storing retracted hand grip, FIG. 10 is a partial section side view taken along line A—A of the framework of FIG. 9.

DETAILED DESCRIPTION OF THE INVENTION

Figure 4:
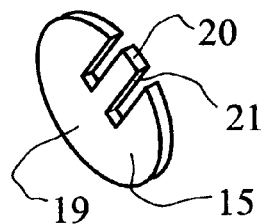
FIG. 4 is a perspective view of an anchor.

Referring in detail to the drawings, in FIG. 1 the shovel of the present invention includes an elongated primary handle 1, with one end attached to a shovel scoop 2, showing the extensible auxiliary grip 3, extended from its holder. The primary handle 1, may be formed as a hollow tube or with linear slots or similar means of cavity which will allow free unrestricted motion of the means of return line 40, towards the anchor point 15.

The extensible auxiliary hand grip may be formed as a hollow tube 3, with the means of tether 4, entering said hollow tube and looping in a typical "A" shape forming an accessible hand opening and hand hold 5. The tethering means may be clamped, spliced or connected 6, in a general "A" shape using any method commonly known to those experienced in the art for fixedly attaching the means of tether. In another form, FIG. 12, hand grip 46, tethering means may be forshortened using a knot 45, or other mechanical connection common to cordage anchors generally know to those experienced in the art.

A "D" shaped grip 9, is located at one end of the elongated primary handle of suitable size to facilitate stability during loading and unloading of the scoop to the side and to act as a fulcrum point when lifting a load using the auxiliary hand grip 3. Said "D" shaped handle may be formed with a means of anchor 15 as part of the embodiment.

In FIG. 1 and FIG. 2, a left framing member 10, and right framing member 11, may be formed as part of the shovel scoop embodiment 2, to form a slight cavity which will hold the extensible grip 3, under the force of the return line as shown in FIG. 2. In the simplest form, said framing members use the retraction force of the biasing means 14, of FIG. 3, to prevent inertial motion by placing the grip 3, in mild compression against said framing members which form a notch or friction like keeper. Said framing members may be of increased complexity, shape and configuration as desired.

In FIG. 9, another form of opposed framing members 10, and 11, formed as part of the shovel embodiment or affixed, are shown having an opening on either side 32, and 33, where means of tether 4, extends towards the said egress area 7, of FIG. 1. The extension of tether 4, through said openings 32, and 33, acts to reduce transverse motion of the hand grip 3, caused by the inertia in the act of shoveling. In FIG. 10, as viewed through section line A—A of FIG. 9, the general curvature, groove, notch, or slot of said framing member 11, is shown with an upper elevation or extension 34, and a lower extension of the framing members 35. These said extensions may be formed in any way which will generally capture the grip 3, using the force of said biasing means of the return line for mounting said grip or to almost completely enclosed an auxiliary hand grip 26, for stowage as in a pocket 25, of FIG. 7.

In FIG. 9, a central opening 37, located between said framing members is for hand access to the grip 3, outlined with a dashed line.

FIG. 3, is another view of primary handle 1, having a passage 13, containing a biasing means, such as a helical extension spring 14, anchored at one end of the handle 15, and distally attached to the tethering means 4, as a means of return line using an intermediary connection 16, of (21) greater dimention than aperture 17, of fairlead 18, as means of blocking to limit extension of the return line and guiding the said tethering means to an egress 7, in FIG. 1. Said intermediary connection 16, may in it's simplest form be a suitable knot tied in said tether means. Said biasing means 14, may also be a resilient elastic for warmer climates or of a material with elastic properties not effected by deeper cold.

FIG. 4, one form of anchor 15, of FIG. 1, is illustrated as a circular disc 19, with an arm 20, as a means of insertion into the terminating helical coil or intermediary connector of said biasing means. Slots 21, on both sides of arm 20, may extend past the centre of the disc 19, to centrally locate a biasing means. The diameter of disc 19, is greater than that of the primary handle passage 13, of FIG. 3, but less than the inside diameter of "D" handle socket 36, of FIG. 2. Said anchor may be any means commonly known to those experienced in the art including a hole in any part of the shovel embodiment distal from said egress.

Figure 5:
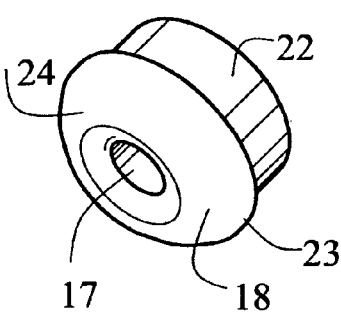
FIG. 5 is a perspective view of tether guide.
Figure 11:
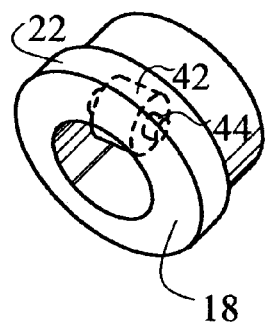
FIG. 11 is a phantom perspective view of fairlead with rotatable elements, and FIG. 12 if a partial top view showing grip and forshortening knot.
Figure 6:
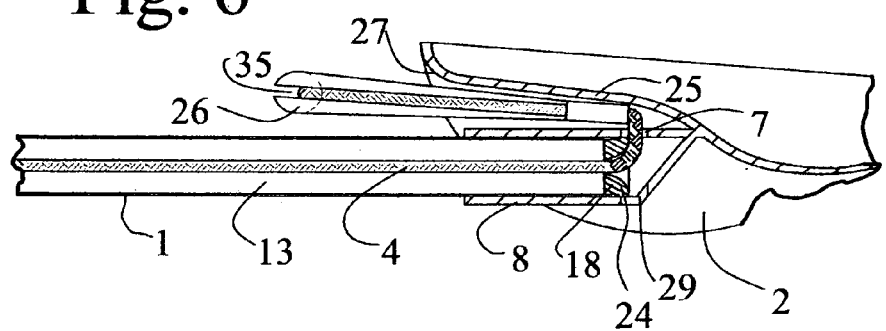
FIG. 6 is a partial side view section drawing of pocket storing grip.

Fairlead 18, of FIG. 5, and 6 may be formed in any shape 22, as a ring or block having an opening through which a tether may pass at diverging angles without snagging or chafing. Fairlead 18 may or may not have rotatable element 42 of FIG. 11 for increased friction reduction of the return line and may have a calibrated orifice to prevent intermediary components of the return line passing through the fairlead. For insertion into said primary handle 1, of FIG. 3. a step of larger dimension 23, is required for controlling the depth of insertion into the said primary handle. Fairlead 18, may be constructed to be located in any part of the shovel with steps and cut out sections or as part of the primary handle embodiment or scoop in any way commonly known to those experienced in the art for redirecting a tether at diverging angles from an anchor point with minimum friction. An arc or curvature 24, also shown in FIG. 6, is provided for dispensing the tethering means 4, towards the grip 26, for extraction and retraction of the extensible hand grip 26, of FIG. 6, in a way suitable to act as a low friction surface which a flexible return line may pass over, or through, to prevent snagging or chafing for extension at diverging angles in guiding the tether from the primary handle 1, to the egress 7, on the shovel scoop 2, of FIG. 1.

Fairlead 18, may be shaped to fit proximal to any elements of the embodiment of said primary handle 1, or socket 8, of FIG. 1. Said Fairlead 18 may contain rotatable elements FIG. 11, 42 with axles 44, or other elements as required to guide the string means 4, as commonly known by those experienced in the art.

Figure 7:
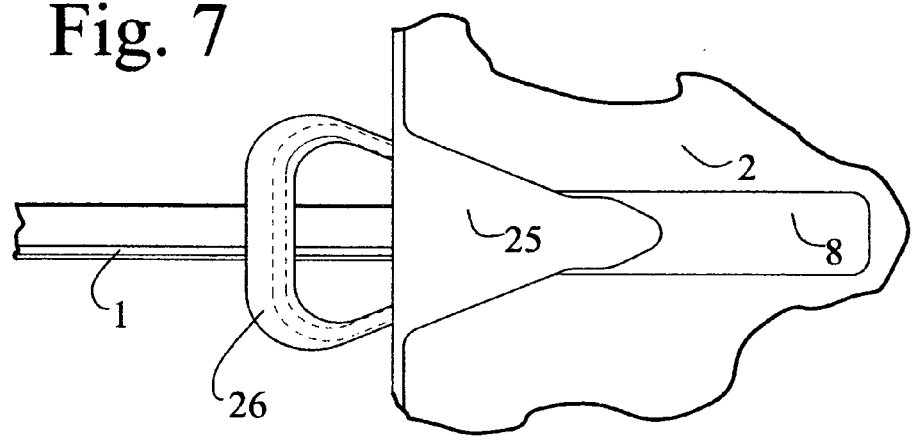
FIG. 7 is a partial top view of a grip and pocket.

FIG. 6, shows another form of the present invention having a partly enclosed pocket 25, formed as part of the shovel scoop embodiment for deposition or stowing another form of hand grip 26, shown in FIG. 7. The extensible tether 4, when extended, may in certain orientations, contact the inside pocket surface on the curvature 27, which is formed and reinforced to act as a guide but mostly as a load bearing support for the force of the means of tether 4, to act in opposition to the force of the load of burden held in the shovel scoop 2. The egress point 7, of FIG. 6, may also be enlarged to act as a fluid or debris drain into the handle socket 8, cavity where it may be further drained using a second opening 29.

Hand grip 26, embodiment material may be flexible or rigid of any thickness or form having a channel 35, of FIG. 6, where tethering means 4, may enclose in an "A" shape and provide strength to the auxiliary hand grip 26. Said pocket may be formed in any way as to mimic the form of said hand grip for the best combination of properties for storage and ease of access.

In another form of the present invention shown in FIG. 8, the said tethering means and said biasing means have been removed from the handle and placed inside a hand grip 30. The hand grip 30, may be constructed in any form which could be stored securely on the embodiment of the shovel for easy access, such as a pocket. The general circular shape of the embodiment 28, must be suitable for forming a recoil rope reel for spooling the return line 40, on the periphery thereof through an egress 31, for winding up or winding out using any suitable channel 38, interposed of a return line located within the said grip 30, using any method commonly known to those experienced in the art.

It will be understood from the preceding description that a return line including a biasing means, and tethering means, or other intermediary components in combination with a grip and holder, could be placed at any point obstensibly in the shovel scoop 2, embodimental material, not necessarily in the primary handle 1, of FIG. 3, but similarly in the form of a recoil rope reel 30, or like spooling mechanism in any method commonly known to those experienced in the art.

It will also be understood that the preceding description of the preferred embodiments of the present invention is for the purposes of illustration only and that the various structural and operational features herein described are susceptible to modifications none of which entails departure from the scope and spirit of the present invention herein disclosed.

The embodiments of the invention in which an exclusive property or privilege is claimed are defined as follows:

1. A shovel having a primary handle, auxiliary grip and scoop comprising;
    (a) a return line composed of a tether having intermediary components connectably attached to a biasing means located in the interior of said primary handle; and
    (b) a fairlead, upon which the return line is routed for dispensation towards the auxiliary grip.

2. A shovel according to claim 1, wherein the fairlead has rotatable elements as an alternative to a curved low friction surface upon which the return line is routed for dispensation to the exterior of said primary handle at diverging angles.

3. A shovel according to claim 1, wherein the fairlead is part of a pocket having a low friction surface or with rotatable elements upon which the return line is routed.

4. A shovel according to claim 1, wherein said fairlead has an orifice of predetermined size to block the passage of intermediary components cooperating on the return line.

5. A shovel according to claim 1, wherein the return line is anchored to a circular disc located on the primary handle.

6. A shovel according to claim 1, wherein a holder for storing an auxiliary hand grip is a pocket.

7. A shovel according to claim 1, wherein return line has a length adjustment means which in its simplest form is a knot foreshortening the return line or a mechanical means of foreshortening.

\* \* \* \* \*